(12) United States Patent
Beard et al.

(10) Patent No.: US 6,952,413 B2
(45) Date of Patent: Oct. 4, 2005

(54) EXTENDED DYNAMIC RESOURCE ALLOCATION IN PACKET DATA TRANSFER

(75) Inventors: Timothy Giles Beard, Newbury (GB); David Edward Cooper, Newbury (GB)

(73) Assignee: Matsushita Electric Industrial Co., Ltd., Osaka (JP)

(*) Notice: Subject to any disclaimer, the term of this patent is extended or adjusted under 35 U.S.C. 154(b) by 26 days.

(21) Appl. No.: 10/787,538

(22) Filed: Feb. 27, 2004

(65) Prior Publication Data

US 2005/0002374 A1 Jan. 6, 2005

(30) Foreign Application Priority Data

Jun. 18, 2003 (GB) .............................. 0314093

(51) Int. Cl.⁷ ............................................ H04B 7/212

(52) U.S. Cl. ...................................... 370/348; 370/337

(58) Field of Search ................................ 370/328, 329, 370/336, 337, 345, 347, 348, 442

(56) References Cited

U.S. PATENT DOCUMENTS

| | | | |
|---|---|---|---|
| 5,729,534 A | 3/1998 | Jokinen et al. | |
| 5,822,308 A | 10/1998 | Malek et al. | |
| 6,356,759 B1 | 3/2002 | Mustajarvi | |
| 6,477,151 B1 | 11/2002 | Oksala | |
| 6,501,745 B1 | 12/2002 | Turina et al. | |
| 2001/0030956 A1 | 10/2001 | Chillariga et al. | |
| 2002/0098860 A1 | 7/2002 | Pecen et al. | |
| 2002/0128035 A1 | 9/2002 | Jokinen et al. | |
| 2002/0155839 A1 | 10/2002 | Nisbet | |
| 2002/0181422 A1 | 12/2002 | Parantalnen et al. | |
| 2003/0095562 A1 | 5/2003 | Liu et al. | |
| 2003/0156546 A1 | 8/2003 | Demetrescu et al. | |
| 2004/0151143 A1 | 8/2004 | Abdesselem et al. | |

FOREIGN PATENT DOCUMENTS

| | | |
|---|---|---|
| EP | 0644702 A1 | 3/1995 |
| EP | 0654916 A2 | 5/1995 |
| EP | 0720405 A2 | 7/1996 |
| EP | 1005243 A1 | 5/2000 |
| EP | 1107620 A2 | 6/2001 |
| EP | 1248479 A2 | 10/2002 |
| GB | 2332595 | 6/1999 |
| GB | 2356528 | 5/2001 |
| JP | 09172674 | 6/1997 |
| JP | 10126847 | 5/1998 |
| WO | 9916275 | 4/1999 |
| WO | 0251177 A1 | 6/2002 |

OTHER PUBLICATIONS

3GPP TS 44/–6–v4.10.0 GSM. Feb. 2003. pp. 1–11; 61–93; and 117–135.*

Search Report dated Nov. 6, 2003.

TS 101 350 V8.5.0 (Jul. 2000), Digital cellular telecommunications system (Phase 2+); General Packet Radio Service (GPRS); Overall description of the GPRS radio interface; Stage 2 (GSM 03.64 version 8.5.0 Release 1999), pp. 1–58.

(Continued)

*Primary Examiner*—Rickey Ngo
*Assistant Examiner*—Derrick W Ferris
(74) *Attorney, Agent, or Firm*—Stevens, Davis, Miller & Mosher, LLP (57) ABSTRACT

A method for control of packet data transmissions in a TDMA wireless network to provide for additional choices in the allocation of communication channels. The fixed relationship in the timing of the downlink allocation signalling and subsequent uplink transmission is altered for certain classes of mobile station to avoid physical constraints. Examples of variations in USF signalling in GPRS are given.

67 Claims, 4 Drawing Sheets

OTHER PUBLICATIONS

3GPP TS 43.064 V5.1.1 (May 2003), 3rd Generation Partnership Project; Technical Specification Group GERAN; Digital cellular telecommunications system (Phase 2+); General Packet Radio Service (GPRS); Overall description of the GPRS radio interface; Stage 2 (Release 5), pp. 1–58.
3GPP TS 45.002 V5.9.0 (Apr. 2003) pp. 1–83.
3GPP TS 45.008 V5.10.0 (Apr. 2003) pp. 1–106.
European Search Report dated Jul. 2, 2004 04000182.8–2412.
European Search Report dated Jul. 2, 2004 04000181.0–2412.
European Search Report dated Jul. 7, 2004 04000183.6–2412.
European Search Report dated Jul. 7, 2004 04000184.4–2412.
3GPP TS 45.002 v6.1.0 (Apr. 2003); 3rd Generation Partnership Project; Technical Specification Group GSM/EDGE: Radio Access Network; Multiplexing and Multiple access on the radio path (Release 6); pp. 1–83.
3GPP TS 45.002 v6.3.0 (Aug. 2003); 3rd Generation Partnership Project; Technical Specification Group GSM/EDGE: Radio Access Network; Multiplexing and multiple access on the radio path (Release 6); pp. 1–84.
3GPP TS 45.002 v6.4.0 (Nov. 2003); 3rd Generation Partnership Project; Technical Specification Group GSM/EDGE: Radio Access Network; Multiplexing and multiple access on the radio path (Release 6); pp. 1–88.

3GPP TS 44.060 v6.4.0 (Sep. 2003); 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6); pp. 1–354.

3GPP TS 44.060 v6.5.0 (Dec. 2003); 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6); pp. 1–356.

3GPP TS 44/–6–v4.10.0 GSM. Feb. 2003. pp. 1–11; 61–93; and 117–135.*

* cited by examiner

EXTENDED DYNAMIC RESOURCE ALLOCATION IN PACKET DATA TRANSFER

BACKGROUND OF THE INVENTION

1. Field of the Invention

This invention relates to multiple access communication systems and in particular it relates to dynamic resource allocation in time division multiple access systems.

2. Description of Related Art

In Multiple access wireless systems such as GSM, a number of mobile stations communicate with a network. The allocation of physical communication channels for use by the mobile stations is fixed. A description of the GSM system may be found in The GSM System for Mobile Communications by M. Mouly and M. B. Pautet, published 1992 with the ISBN reference 2-9507190-0-7.

With the advent of packet data communications over Time Division Multiple Access (TDMA) systems, more flexibility is required in the allocation of resources and in particular in the use of physical communication channels. For packet data transmissions in General Packet Radio Systems (GPRS) a number of Packet Data CHannels (PDCH) provide the physical communication links. The time division is by frames of 4.615 ms duration and each frame has eight consecutive 0.577 ms slots. A description of the GPRS system may be found in (3GPP TS 43.064 v5.1.1). The slots may be used for uplink or downlink communication. Uplink communication is a transmission from the mobile station for reception by the network to which it is attached. Reception by the mobile station of a transmission from the network is described as downlink.

In order to utilise most effectively the available bandwidth, access to channels can be allocated in response to changes in channel conditions, traffic loading, Quality of Service and subscription class. Owing to the continually changing channel conditions and traffic loadings a method for dynamic allocation of the available channels is available.

The amounts of time that the mobile station receives downlink or transmits uplink may be varied and slots allocated accordingly. The sequences of slots allocated for reception and transmission, the so-called multislot pattern is usually described in the form RXTY. The allocated receive (R) slots being the number X and the allocated transmit slots (T) the number Y.

A number of multislot classes, one through to 45, is defined for GPRS operation and the maximum uplink (Tx) and downlink (Rx) slot allocations are specified for each class.

In a GPRS system, access to a shared channel is controlled by means of an Uplink Status Flag (USF) transmitted on the downlink to each communicating mobile station (MS). In GPRS two allocation methods are defined, which differ in the convention about which uplink slots are made available on receipt of a USF. The present invention relates to a particular allocation method, in which an equal number "N" of PDCH's, a "PDCH" representing a pair of uplink and downlink slots corresponding to each other on a 1—1 basis, are allocated for potential use by the MS. The uplink slots available for actual use by a particular mobile station sharing the uplink channel are indicated in the USF. The USF is a data item capable of taking 8 values V0–V7, and allows uplink resources to be allocated amongst up to 8 mobiles where each mobile recognises one of these 8 values as 'valid', i.e. conferring exclusive use of resources to that mobile. A particular mobile station may recognise a different USF value on each of the slots assigned to that mobile station. In the case of the extended dynamic allocation method, for example, reception of a valid USF in the slot 2 of the present frame will indicate the actual availability for transmission of transmit slots 2 . . . N in the next TDMA frame or group of frames, where N is the number of allocated PDCHs. Generally for a valid USF received at receiver slot n, transmission takes place in the next transmit frame at transmit slots n, n+1 et seq. to the allocated number of slots (N). For the extended dynamic allocation method as presently defined these allocated slots are always consecutive.

The mobile station is not able instantly to switch from a receive condition to a transmit condition or vice versa and the time allocated to these reconfigurations is known as turnaround time. It is also necessary for the mobile station, whilst in packet transfer mode, to perform neighbourhood cell measurements. The mobile station has continuously to monitor all Broadcast Control Channel (BCCH) carriers as indicated by the BA (GPRS) list and the BCCH carrier of the serving cell. A received signal level measurement sample is taken in every TDMA frame, on at least one of the BCCH carriers. (3GPP TS 45.008v5 10.0). The turnaround and measurement times guaranteed by the network for a mobile station depend on the multislot class to which the mobile claims conformance (3GPP TS 45.002v5.9.0 Annex B).

The neighbour cell measurements are taken prior to re-configuration from reception to transmission or prior to re-configuration from transmission to reception.

A mobile station operating in extended dynamic allocation mode presently must begin uplink transmission in the Tx timeslot corresponding to the Rx timeslot in which the first valid USF is recognised. That is to say that there is a fixed relationship in the timing of the downlink allocation signalling and subsequent uplink transmission. Owing to the physical limitations of single transceiver mobile stations some desirable multislot configurations are not available for use.

These restrictions reduce the availability of slots for uplink transmissions thereby reducing the flow of data and the flexibility of response to changing conditions. There is a need therefore to provide a method with which to enable the use of those multislot configurations currently unavailable for Extended Dynamic Allocation.

SUMMARY OF THE INVENTION

It is an object of this invention to reduce the restrictions affecting extended dynamic allocation with minimal effect on the existing prescript. This may be achieved by altering the fixed relationship in the timing of the downlink allocation signalling and subsequent uplink transmission for certain classes of mobile station.

In accordance with the invention there is a method for controlling uplink packet data transmissions and a mobile station operating in accordance with the method as set out in the attached claims.

BRIEF DESCRIPTION OF THE DRAWINGS

An embodiment of the invention will now be described with reference to the accompanying figures in which.

DETAILED DESCRIPTION OF THE PREFERRED EMBODIMENTS

In this embodiment, the invention is applied to a GPRS wireless network operating in accordance with the standards applicable to multislot classes.

Figure 1:
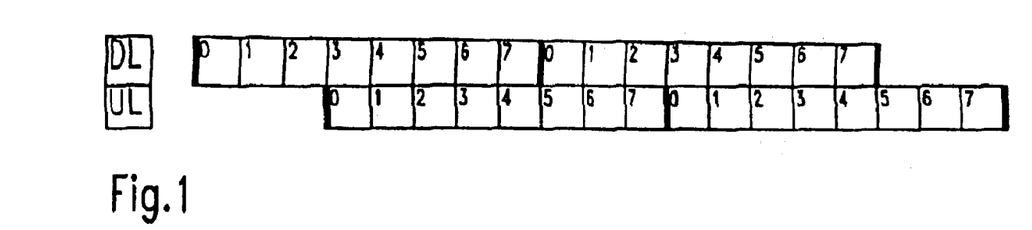
FIG. 1 illustrates the GPRS TDMA frame structure showing the numbering convention used for uplink (UL) and downlink (DL) timeslots.

In FIG. 1 the GPRS TDMA frame structure is illustrated and shows the numbering convention used for uplink (Tx) and downlink (Rx) timeslots. It should be noted that in practice Tx may be advanced relative to Rx due to timing advance (TA), although this is not shown in the illustration. Thus in practice the amount of time between the first Rx and first Tx of a frame may be reduced a fraction of a slot from the illustrated value of 3 slots due to timing advance.

Two successive TDMA frames are illustrated with downlink (DL) and uplink (UL) slots identified separately. The slot positions within the first frame are shown by the numerals 0 through to 7 with the transmission and reception slots offset by a margin of three slots. This is in accordance with the convention that that the first transmit frame in a TDMA lags the first receive frame by an offset of 3 (thus ordinary single slot GSM can be regarded as a particular case in which only slot 1 of transmit and receive is used).

The remaining figures conform to the illustration of FIG. 1 but the slot numbering has been removed for extra clarity. The shaded slots are those allocated for the particular states and the arrowed inserts indicate the applicable measurement and turnaround intervals. The hashed slots indicate reception of a valid USF and the timeslot in which that USF is received. As mentioned above, constraints are imposed by the need to allow measurement and turnaround slots and the prescript for these in 3GPP TS 45.002 Annex B limits dynamic allocation as shown in table 1.

TABLE 1

| Multislot class | Maximum number of slots | | | Minimum number of slots | | | |
|---|---|---|---|---|---|---|---|
| | Rx | Tx | Sum | $T_{ta}$ | $T_{tb}$ | $T_{ra}$ | $T_{rb}$ |
| 7 | 3 | 3 | 4 | 3 | 1 | 3 | 1 |
| 34 | 5 | 5 | 6 | 2 | 1 | 1 | 1 |
| 39 | 5 | 5 | 6 | 2 | 1 | 1 + to | 1 |
| 45 | 6 | 6 | 7 | 1 | 1 | 1 | to |

Figure 2:
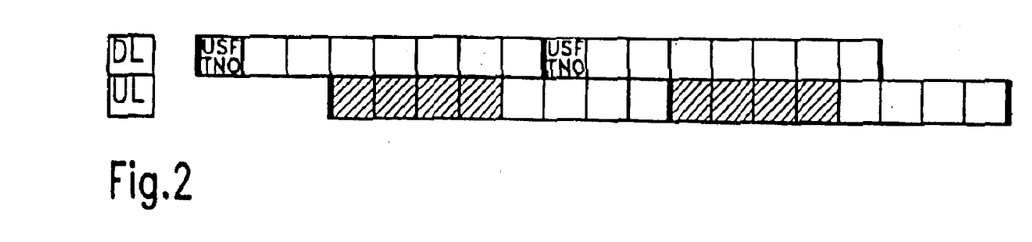
FIG. 2 illustrates a prior art 4 slot steady state allocation R1T4.

$T_{ta}$ is the time needed for the MS to perform adjacent cell signal level measurement and get ready to transmit.
$T_{tb}$ is the time needed for the MS to get ready to transmit
$T_{ra}$ is the time needed for the MS to perform adjacent cell signal level measurement and get ready to receive.
$T_{rb}$ is the time needed for the MS to get ready to receive
It should be noted that in practice the times $T_{ta}$ and $T_{tb}$ may be reduced by a fraction of a slot due to timing advance.
$t_0$ is 31 symbol periods timing advance offset With reference to FIG. 2, a steady state single downlink and 4 uplink slot allocation for a class 34 mobile station is illustrated. The turnaround and measurement periods for this class are shown in table 1 as Tra, Trb and Ttb each having one slot and Tta having two slots. These periods can be accommodated for this allocation when a valid USF is received in time slot 0.

Figure 3:
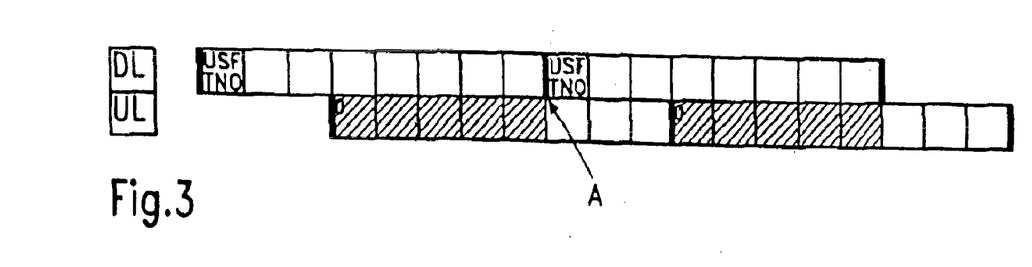
FIG. 3 illustrates a 5 slot steady state allocation R1T5 prohibited in the prior art.

When the allocation of uplink slots extends to five, however, a constraint arises as indicated in the illustration of FIG. 3 which is for a class 34 mobile station with an allocation of one downlink and five uplink slots.

The constraint occurs at the position indicated by 'A' because no time is allowed for the changeover from transmit to receive (Trb). In the downlink time slot 0 a valid USF is received and the following two slots provide for Tta. In accordance with the invention, for this embodiment, the mobile has uplink slots assigned in the usual way, through the use of USF_TN0 . . . USF_TN7 Information Elements in Packet Uplink Assignment and Packet Timeslot Reconfigure messages. The network sends the USF, however, for both first and second assigned timeslots on the downlink PDCH associated with the second assigned timeslot.

Figure 4:
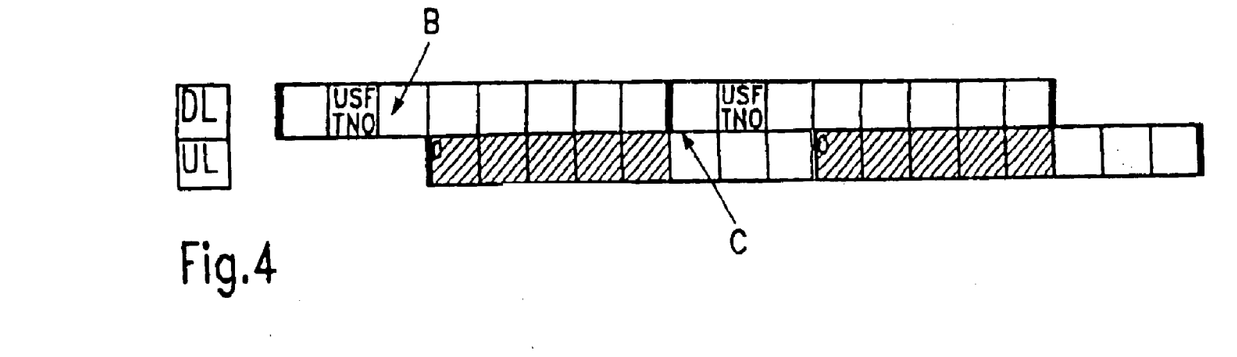
FIG. 4 illustrates a 5 slot steady state allocation R1T5 enabled by the method of the present invention.

Considering by way of example a class 34 MS with an assignment of 5 uplink slots (TN0–TN4) as discussed above where the network sends USF_TN0 on timeslot 1 rather than timeslot 0. This arrangement is illustrated in FIG. 4 where it can be seen that slots marked 'B' and 'C' provide for turnaround times Tra and Trb respectively.

An allocation by the network of 4 uplink slots to the MS will be signalled by the sending of USF_TN1 on timeslot 1. The characters of the two signals USF_TN0 and USF_TN1 must differ and must be distinguishable by the mobile station.

It is not necessary to add extra information elements to indicate when the Shifted USF mechanism is to be used, as it may be made implicit in the timeslot allocations for the particular multislot class of the mobile station. Therefore no increase in signalling overhead would be required.

Figure 5:
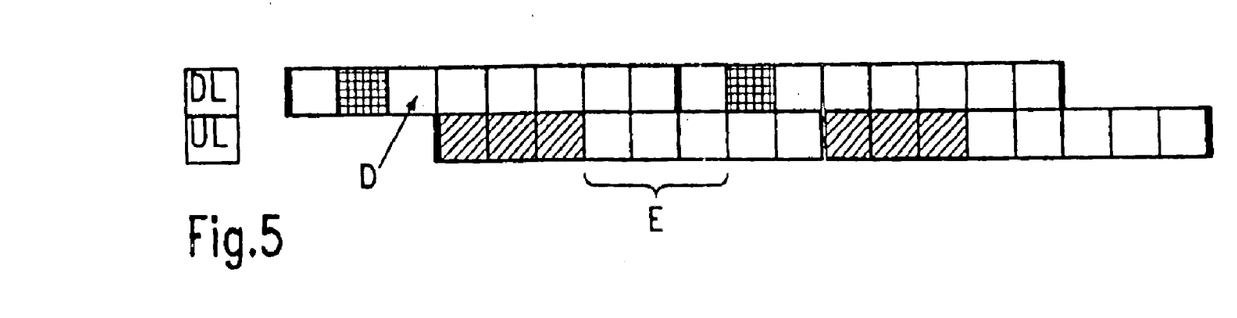
FIG. 5 illustrates a shifted USF applied to a class 7 MS with 3 uplink slots allocated.

With reference to FIG. 5, another example of an allocation enabled by implementation of a shifted USF is illustrated in FIG. 5. The application is a class 7 MS with three uplink slots allocated. The USF on downlink slot 1 allocating the 3 uplink slots indicates that the first uplink slot available is uplink slot 0 rather than the usual slot 1. This provides for the Ttb and Tra periods (as required by table 1) and as indicated in FIG. 5 at D and E respectively. The allocation would not previously have been available for want of a sufficient period for Tra.

Figure 6:
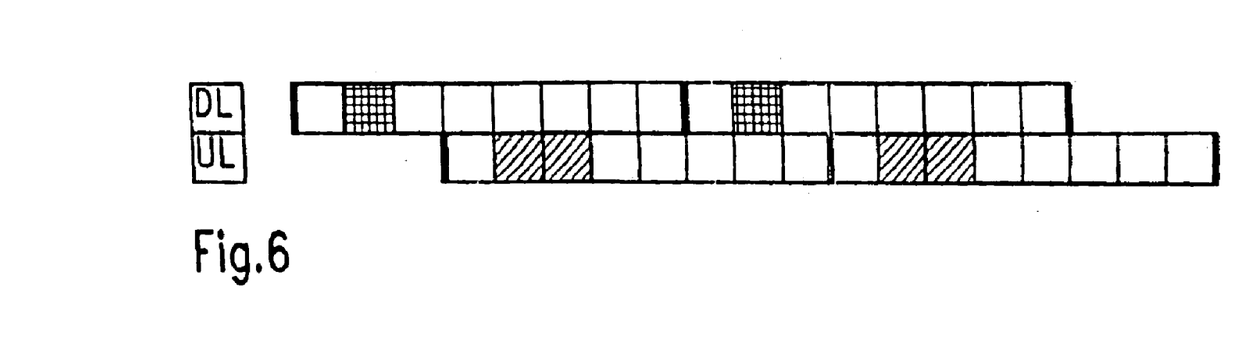
FIG. 6 illustrates a class 7 MS with 2 uplink slots allocated.

The 2 slot allocation illustrated in FIG. 6 reverts to normal operation i.e. the USF is not shifted. There are no physical constraints in normal allocations for this 2 slot arrangement of FIG. 6 and the standard USF in time slot 1 allocates uplink slots beginning with uplink slot number 1.

Figure 7:
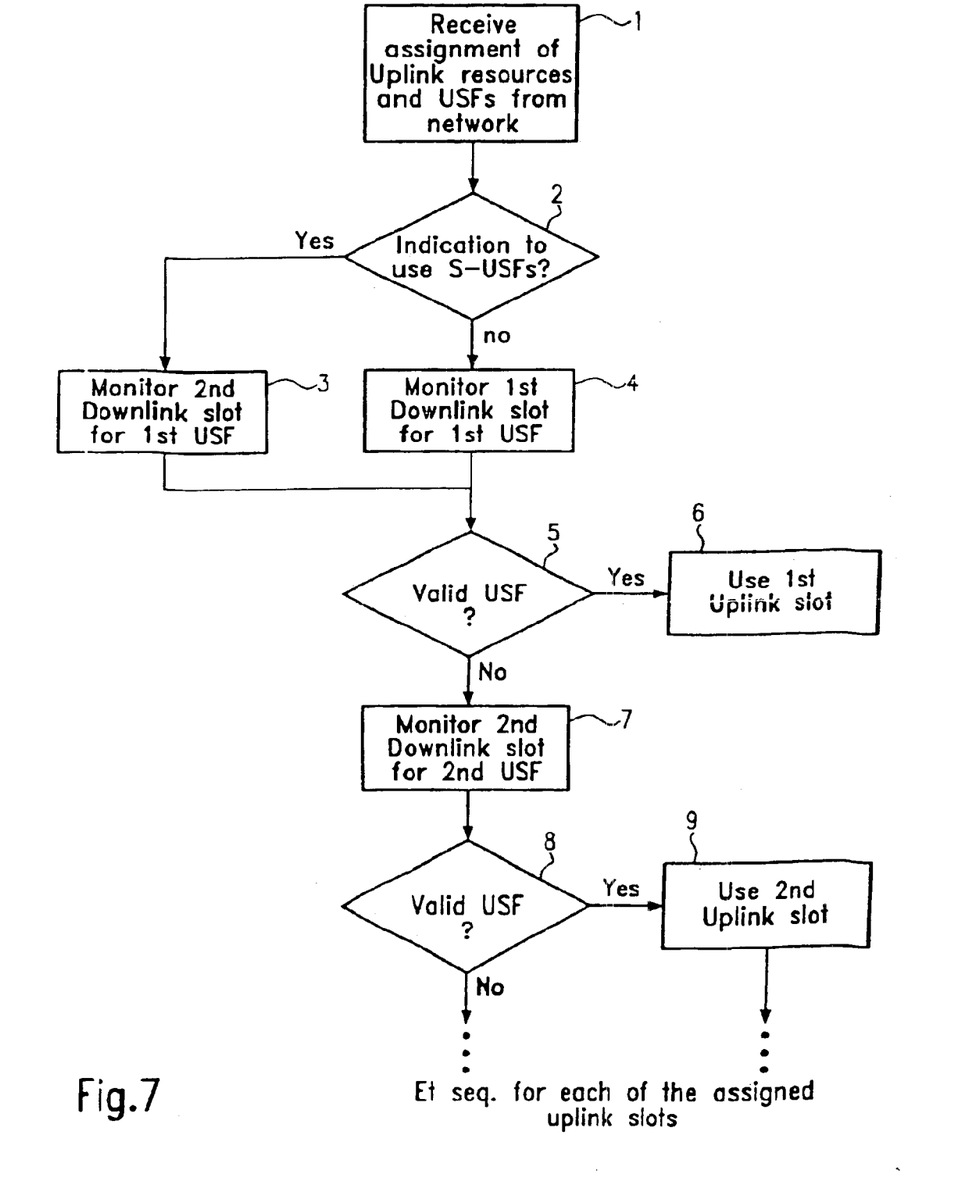
FIG. 7 is a flow diagram for the implementation of shifted USF in a mobile station.

Alternatively it may be convenient to apply positive signalling of the shift in position of the uplink allocation and an implementation of a shifted USF in a mobile station operating extended dynamic allocation is illustrated in FIG. 7. It should be noted that the indication (2) in FIG. 7 may be explicit (i.e. extra signalling) or implicit (automatic for particular multislot class configuration). With reference to FIG. 7, the mobile station receives at 1 an assignment of uplink resources and USF's from the network. If at 2, an indication to use a shifted USF is detected then, for the first USF, the second downlink slot is monitored (3) otherwise the first downlink slot is monitored (4). In either case, when a valid USF has been received at 5 then uplink transmissions are initiated in the first uplink slot from the mobile station (6). When no valid USF has been received at 5 then the second downlink slot is monitored for a second USF at 7 and if valid (8) then uplink transmissions are initiated in the second uplink slot (9).

In the examples illustrated in FIGS. 2 to 6 the allocations are steady state such that the allocations shown are maintained from frame to frame. The invention is not restricted to steady state allocations and may be applied also to control of uplink resources that change from one frame to another.

Figures 8, 9:
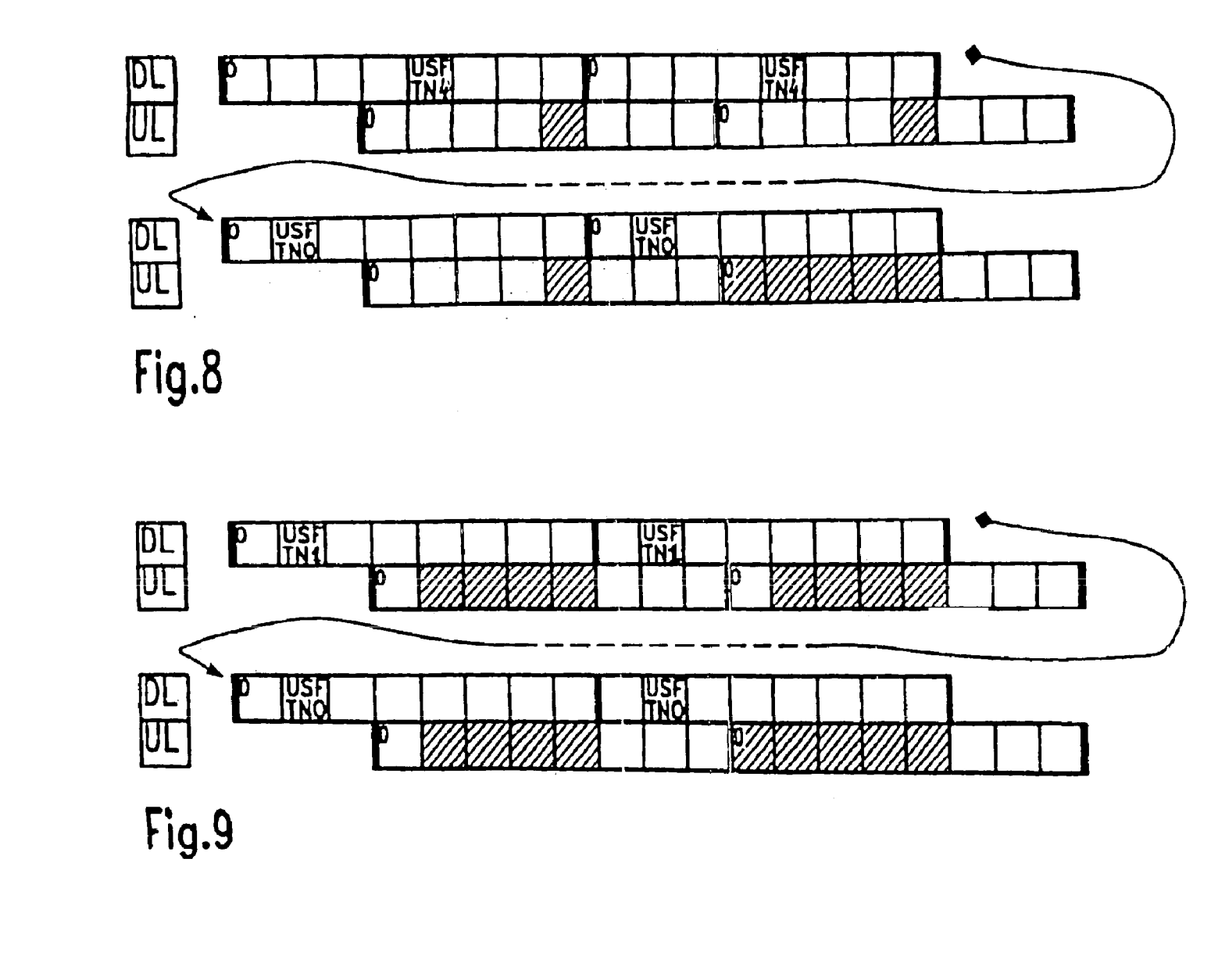
FIG. 8 illustrates a transition from one uplink slot to five uplink slots for a class 34 MS.
FIG. 9 illustrates a transition from four to five uplink slots for a class 34 MS.

Examples of transitions are illustrated in FIGS. 8 and 9. These figures each represent four consecutive frames but have been split for presentation.

FIG. 8 illustrates the transition from one uplink slot allocation to five uplink slots allocation, for a Class 34 mobile. The first (top) two frames show steady state operation with one slot and the next (bottom) two frames show the transitional frames. For this transition the slot location of the USF is changed.

FIG. 9 illustrates the transition from four uplink slots to five uplink slots, for a Class 34 mobile. The first two frames show steady state operation with four slots and the next two frames show the transitional frames. For this transition the USF slot location is constant but the value of the USF is changed.

In order to implement the invention in GPRS for example a table (Table 2) may be constructed for a Type 1 MS to allow extended dynamic allocation using the principles below:

In the case of extended dynamic allocation it is desirable for the MS to be able to "transmit up to its physical slot limit"; specifically, the MS should be able to transmit the maximum number of slots possible according to the limitation of its multislot class, while continuing to receive and decode the USF value on exactly one slot and performing measurements. If it is not possible to define a multislot configuration which permits the MS to "transmit up to its physical slot limit" using $T_{ra}$, but it would be possible by using $T_{ta}$, then $T_{ta}$ shall be used.

If it is not possible to define a multislot configuration for extended dynamic allocation which permits the MS to "transmit up to its physical slot limit" but it would be possible by using the shifted USF mechanism, then shifted USF shall be used. In this case $T_{ra}$ will be used as first preference, but if this is not possible $T_{ta}$ will be used as second preference.

TABLE 2

| Medium access mode | No of Slots | $T_{ra}$ shall apply | $T_{ta}$ shall apply | Applicable Multislot classes | Note |
|---|---|---|---|---|---|
| Uplink, Ext. Dynamic | 1–3 | Yes | — | 1–12, 19–45 | |
| | 4 | No | Yes | 33–34, 38–39, 43–45 | 2 |
| | 5 | Yes | — | 34, 39 | 5 |
| | 5 | No | Yes | 44–45 | 2, 4 |
| | 6 | No | Yes | 45 | 5 |
| Down + up, Ext. Dynamic | d + u = 2 − 4 | Yes | — | 1–12, 19–45 | |
| | d + u = 5, d > 1 | Yes | — | 8–12, 19–45 | |
| | d = 1, u = 4 | No | Yes | 30–45 | 2 |
| | d + u = 6, d > 1 | Yes | | 30–45 | 2, 3 |
| | d = 1, u = 5 | Yes | | 34, 39 | 5 |
| | d + u = 7, d > 1 | No | Yes | 40–45 | 2, 4 |
| | d = 1, u = 6 | No | Yes | 45 | 5 |

Note 1
Normal measurements are not possible (see 3GPP TS 45.008).
Note 2
Normal BSIC decoding is not possible (see 3GPP TS 45.008).
Note 3
TA offset required for multislot classes 35–39.
Note 4
TA offset required for multislot classes 40–45.
Note 5
Shifted USF operation shall apply (see 3GPP TS 44.060)

What is claimed is:

1. A multiple access communication method in a mobile station, comprising the steps of:
   monitoring a downlink slot to detect a USF (Uplink Status Flag); and
   transmitting on an uplink slot corresponding to the USF,
   wherein (i) if shifted USF operation is not used then a first downlink slot is monitored to detect a USF corresponding to a first uplink slot and (ii) if the shifted USF operation is used then a second downlink slot is monitored to detect the USF corresponding to the first uplink slot and a USF corresponding to a second uplink slot.

2. The method according to claim 1, wherein if the USF corresponding to the first uplink slot is detected on the second downlink slot then the transmitting is performed on the first uplink slot and all higher numbered uplink slots allocated for uplink transmission.

3. The method according to claim 1, wherein the second downlink slot is the next numbered downlink slot of the first downlink slot.

4. The method according to claim 1, wherein a value of the USF corresponding to the first uplink slot is different from a value of the USF corresponding to the second uplink slot.

5. A multiple access communication method in a mobile station, comprising the steps of:
   receiving an assignment of at least a first PDCH (packet data channel) and a second PDCH;
   monitoring an assigned PDCH to detect a USF; and
   transmitting on an assigned PDCH corresponding to the USF,
   wherein (i) if shifted USF operation is not used then a first assigned PDCH is monitored to detect a USF corresponding to the first assigned PDCH and (ii) if the shifted USF operation is used then a second assigned PDCH is monitored to detect the USF corresponding to the first assigned PDCH and a USF corresponding to the second assigned PDCH.

6. The method according to claim 5, wherein if the USF corresponding to the first assigned PDCH is detected on the second assigned PDCH then the transmitting is performed on the first assigned PDCH and all higher numbered assigned PDCHs.

7. The method according to claim 5, wherein the second assigned PDCH is the next numbered PDCH of the first assigned PDCH.

8. The method according to claim 5, wherein a value of the USF corresponding to the first assigned PDCH is different from a value of the USF corresponding to the second assigned PDCH.

9. A multiple access communication method in a mobile station, comprising the steps of:
   receiving an assignment of at least a first PDCH and a second PDCH,
   monitoring a second assigned PDCH to detect a USF corresponding to a first assigned PDCH and a USF corresponding to the second assigned PDCH; and
   if the USF corresponding to the first assigned PDCH is detected then transmitting on the first assigned PDCH and all higher numbered assigned PDCHs.

10. The method according to claim 9, wherein if the USF corresponding to the second assigned PDCH is detected on the second assigned PDCH then the transmitting is performed on the second assigned PDCH and all higher numbered assigned PDCHs.

11. The method according to claim 9, wherein the second assigned PDCH is the next numbered PDCH of the first assigned PDCH.

12. The method according to claim 9, wherein a value of the USF corresponding to the first assigned PDCH is different from a value of the USF corresponding to the second assigned PDCH.

13. The method according to claim 1, wherein if a USF corresponding to a nth (n being an integer) uplink slot is detected on a nth downlink slot then the transmitting is performed on the nth uplink slot.

14. The method according to claim 13, wherein if the USF corresponding to the nth uplink slot is detected on the nth downlink slot then the transmitting is performed on the nth uplink slot and all higher numbered uplink slots allocated for uplink transmission.

15. The method according to claim 1, wherein the transmitting is performed on the next transmission frame or consecutive group of transmission frames.

16. The method according to claim 1, wherein eight consecutive slots form a TDMA frame.

17. The according to claim 16, wherein the start of a TDMA frame on the uplink is delayed by three slots or three slots minus a fraction of a slot from the start of a TDMA frame on the downlink.

18. The method according to claim 17, further comprising the step of performing adjacent cell signal level measurement and preparation for reception prior to re-configuration from transmission to reception.

19. The method according to claim 18, wherein the time needed for performing adjacent cell signal level measurement and preparation for reception is three slots.

20. The method according to claim 18, wherein the time needed for performing adjacent cell signal level measurement and preparation for reception is one slot.

21. The method according to claim 18, wherein the time needed for performing adjacent cell signal level measurement and preparation for reception is one slot and 31 symbol periods timing advance offset.

22. The method, according to claim 17, further comprising the step of performing adjacent cell signal level measurement and preparation for transmission prior to re-configuration from reception to transmission, wherein the time needed for performing adjacent cell signal level measurement and preparation for transmission is one slot.

23. The method according to claim 19, wherein the use of shifted USF operation is indicated if three slots are allocated for the uplink transmission in the TDMA frame on the uplink.

24. The method according to claim 21, wherein the use of shifted USF operation is indicated if five slots are allocated for the uplink transmission in the TDMA frame on the uplink.

25. The method according to claim 21, wherein the use of shifted USF operation is indicated if five slots are allocated for the uplink transmission in the TDMA frame on the uplink.

26. The method according to claim 22, wherein the use of shifted USF operation is indicated if six slots are allocated for the uplink transmission in the TDMA frame on the uplink.

27. The method according to claim 23, wherein the indication to use shifted USF operation is automatically done.

28. The method according to claim 24, wherein the indication to use shifted USF operation is automatically done.

29. The method according to claim 25, wherein the indication to use shifted USF operation is automatically done.

30. The method according to claim 26, wherein the indication to use shifted USF operation is automatically done.

31. The method according to claim 1, wherein the number of multislot class of the mobile station is any one of the multislot classes 7, 34, 39 and 45.

32. The method according to claim 5, wherein the number of multislot class of the mobile station is any one of the multislot classes 7, 34, 39 and 45.

33. The method according to claim 9, wherein the number of multislot class of the mobile station is any one of the multislot classes 7, 34, 39 and 45.

34. A mobile station apparatus for multiple access communication, comprising:
    a detection section that monitors a downlink slot to detect a USF; and
    a transmission section that transmits on an uplink slot corresponding to the USF,
    wherein (i) if shifted USF operation is not used then the detection section monitors a first downlink slot to detect a USF corresponding to a first uplink slot and (ii) if the shifted USF operation is used then the detection section monitors a second downlink slot to detect the USF corresponding to the first uplink slot and a USF corresponding to a second uplink slot.

35. The apparatus according to claim 34, wherein if the USF corresponding to the first uplink slot is detected on the second downlink slot then the transmission section transmits on the first uplink slot and all higher numbered uplink slots allocated for uplink transmission.

36. The apparatus according to claim 34, wherein the second downlink slot is the next numbered downlink slot of the first downlink slot.

37. The apparatus according to claim 34, wherein a value of the USF corresponding to the first uplink slot is different from a value of the USF corresponding to the second uplink slot.

38. A mobile station apparatus for multiple access communication, comprising:
    a reception section that receives an assignment of at least a first PDCH and a second PDCH;
    a detection section that monitors an assigned PDCH to detect a USF; and
    a transmission section that transmits on an assigned PDCH corresponding to the USF,
    wherein (i) if shifted USF operation is not used then a first assigned PDCH is monitored to detect a USF corresponding to the first assigned PDCH and (ii) if the shifted USF operation is used then a second assigned PDCH is monitored to detect the USF corresponding to the first assigned PDCH and a USF corresponding to the second assigned PDCH.

39. The apparatus according to claim 38, wherein if the USF corresponding to the first assigned PDCH is detected on the second assigned PDCH then the transmission section transmits on the first assigned PDCH and all higher numbered assigned PDCHs.

40. The apparatus according to claim 38, wherein the second assigned PDCH is the next numbered PDCH of the first assigned PDCH.

41. The apparatus according to claim 38, wherein a value of the USF corresponding to the first assigned PDCH is different from a value of the USF corresponding to the second assigned PDCH.

42. A mobile station apparatus for multiple access communication, comprising:
    a reception section that receives an assignment of at least a first PDCH and a second PDCH;
    a detection section that monitors a second assigned PDCH to detect a USF corresponding to a first assigned PDCH and a USF corresponding to the second assigned PDCH; and
    a transmission section that transmits on the first assigned PDCH and all higher numbered assigned PDCHs if the USF corresponding to the first assigned PDCH is detected on the second assigned PDCH.

43. The apparatus according to claim 42, wherein if the USF corresponding to the second assigned PDCH is detected on the second assigned PDCH then the transmission section transmits on the second assigned PDCH and all higher numbered assigned PDCHs.

44. The apparatus according to claim 42, wherein the second assigned PDCH is the next numbered PDCH of the first assigned PDCH.

45. The apparatus according to claim 42, wherein a value of the USF corresponding to the first assigned PDCH is different from a value of the USF corresponding to the second assigned PDCH.

46. The apparatus according to claim 34, wherein a USF corresponding to a nth (n being an integer) uplink slot is detected on a nth downlink slot then the transmission section transmits on the nth uplink slot.

47. The apparatus according to claim 46, wherein if the USF corresponding to the nth uplink slot is detected on the nth downlink slot then the transmission section transmits on the nth uplink slot and all higher numbered uplink slots allocated for uplink transmission.

48. The apparatus according to claim 34, wherein the transmission section transmits on the next transmission frame or consecutive group of transmission frames.

49. The apparatus according to claim 34, wherein eight consecutive slots form a TDMA frame.

50. The apparatus according to claim 49, wherein the start of a TDMA frame on the uplink is delayed by three slots or three slots minus a fraction of a slot from the start of a TDMA frame on the downlink.

51. The apparatus according to claim 50, further comprising a measurement section that performs adjacent cell signal level measurement prior to re-configuration from transmission to reception or prior to re-configuration from reception to transmission.

52. The apparatus according to claim 51, wherein the measurement section performs adjacent cell signal level measurement prior to re-configuration from transmission to reception and the time needed for performing adjacent cell signal level measurement and preparation for reception is three slots.

53. The apparatus according to claim 51, wherein the measurement section performs adjacent cell signal level measurement prior to re-configuration from transmission to reception and the time needed for performing adjacent cell signal level measurement and preparation for reception is one slot.

54. The apparatus according to claim 51, wherein the measurement section performs adjacent cell signal level measurement prior to re-configuration from transmission to reception and the time needed for performing adjacent cell signal level measurement and preparation for reception is one slot and 31 symbol periods timing advance offset.

55. The apparatus according to claim 51, wherein the measurement section performs adjacent cell signal level measurement prior to re-configuration from reception to transmission and the time needed for performing adjacent cell signal level measurement and preparation for transmission is one slot.

56. The apparatus according to claim 52, wherein the use of shifted USF operation is indicated if three slots are allocated for the uplink transmission in the TDMA frame on the uplink.

57. The apparatus according to claim 53, wherein the use of shifted USF operation is indicated if five slots are allocated for the uplink transmission in the frame on the uplink.

58. The apparatus according to claim 54, wherein the use of shifted USF operation is indicated if five slots are allocated for the uplink transmission in the TDMA frame on the uplink.

59. The apparatus according to claim 55, wherein the use of shifted USF operation is indicated if six slots are allocated for the uplink transmission in the TDMA frame on the uplink.

60. The apparatus according to claim 56, wherein the indication to use shifted USF operation is automatically done.

61. The apparatus according to claim 57, wherein the indication to use shifted USF operation is automatically done.

62. The apparatus according to claim 58, wherein the indication to use shifted USF operation is automatically done.

63. The apparatus according to claim 59, wherein the indication to use shifted USF operation is automatically done.

64. The apparatus according to claim 34, wherein the number of multislot class of the mobile station is any one of the multislot classes 7, 34, 39 and 45.

65. The apparatus according to claim 38, wherein the number of multislot class of the mobile station is any one of the multislot classes 7, 34, 39 and 45.

66. The apparatus according to claim 42, wherein the number of multislot class of the mobile station is any one of the multislot classes 7, 34, 39 and 45.

67. A multiple access communication system having a mobile station and a network, wherein the network transmits USF on a downlink slot to the mobile station, the mobile station comprising:
a detection section that monitors a downlink slot to detect the USF; and
a transmission section that transmits on an uplink slot corresponding to the USF,
wherein (i) if shifted USF operation is not used then the detection section monitors a first downlink slot to detect a USF corresponding to a first uplink slot and (ii) if the shifted USF operation is used then the detection section monitors a second downlink slot to detect the USF corresponding to the first uplink slot and, a USF corresponding to a second uplink slot.

* * * * *